United States Patent [19]

Suzaki et al.

[11] Patent Number: 4,565,914

[45] Date of Patent: Jan. 21, 1986

[54] METHOD AND APPARATUS FOR DEMOUNTING A SPOT WELDED METAL PLATE

[75] Inventors: Hidenori Suzaki, Uji; Tetsuro Miura, Tenri; Masanori Maeda, Higashiosaka; Koji Inaoka, Hirakata, all of Japan

[73] Assignee: Matsushita Electric Industrial Co., Ltd., Osaka, Japan

[21] Appl. No.: 490,155

[22] Filed: Apr. 29, 1983

[30] Foreign Application Priority Data

Apr. 30, 1982 [JP] Japan .................................. 57-73623
May 4, 1982 [JP] Japan .................................. 57-74918

[51] Int. Cl.[4] ............................................... B23P 1/06
[52] U.S. Cl. .................................... 219/68; 219/69 R; 219/69 E; 219/70
[58] Field of Search ...................... 219/68, 69 R, 69 E, 219/69 M, 70, 69 V, 72, 228, 229, 232; 204/129.1, 129.5, 129.6, 280, 286

[56] References Cited

U.S. PATENT DOCUMENTS

| | | | |
|---|---|---|---|
| 802,707 | 10/1905 | Peters | 219/68 |
| 2,427,588 | 9/1947 | Burnett | 219/69 E |
| 2,510,960 | 6/1950 | Danhier | 219/69 E |
| 2,715,172 | 8/1955 | Larkins, Jr. | 219/69 E |
| 2,718,581 | 9/1955 | Thomas | 219/69 E |
| 2,751,482 | 6/1956 | Stepath | 219/70 |
| 2,818,490 | 12/1957 | Dixon et al. | 219/69 E |
| 3,200,231 | 8/1965 | Bejat | 219/69 E |
| 3,306,838 | 2/1967 | Johnson | 219/69 E |
| 3,427,423 | 2/1969 | O'Connor | 219/69 E |
| 3,475,312 | 10/1969 | Inoue | 219/68 |
| 3,524,038 | 8/1970 | O'Kelly, Jr. | 219/70 |
| 3,561,662 | 2/1971 | Duhaime et al. | 219/229 |
| 3,622,735 | 11/1971 | Mainwaring | 219/69 E |
| 4,023,005 | 5/1977 | Bolin | 219/121 LM |

FOREIGN PATENT DOCUMENTS 709483 5/1965 Canada .................................. 219/69 V
856727 8/1981 U.S.S.R. .................................. 219/69 M Primary Examiner—C. L. Albritton
Assistant Examiner—Geoffrey S. Evans
Attorney, Agent, or Firm—Wenderoth, Lind & Ponack

[57] ABSTRACT

A method and apparatus for demounting a metal plate spot welded to a metal member. In accordance with the method, a hollow electrode rod is placed in opposition to the periphery of a spot weld between the metal plate and the metal member, an electric arc is formed between the electrode rod and the metal plate, the periphery of the spot weld is melted with arc heat, and the resultant molten metal is drawn up through the hollow portion of the electrode rod. The method may be performed with an apparatus having a hollow internal rod which includes an electrode rod retaining portion at a forward tip end thereof. A rod retaining mechanism retains the internal rod for free longitudinal movement in opposite forward and rearward directions, elastically urged in the forward direction. A sliding block is movable in the forward and rearward directions, urged forward by an elastic member. Structure is provided to prevent movement of the sliding block forward of a predetermined forward position. A device is provided for engaging the sliding block with the internal rod and moving the sliding block and internal rod in a rearward direction to a predetermined rearward position. Also provided is a device for releasing engagement between the sliding block and the internal rod, a guide piece mounted on the retaining mechanism for establishing a reference position from which the free end of the electrode rod is movable a predetermined distance rearward of a metal member to be treated, and structure for drawing melted metal rearward through the hollow electrode rod and internal rod.

13 Claims, 13 Drawing Figures

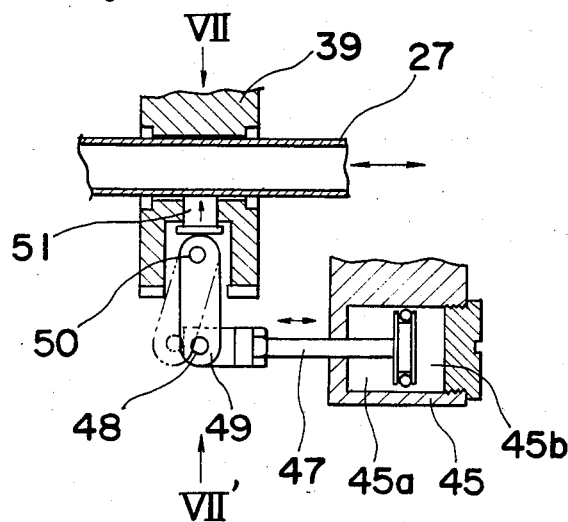
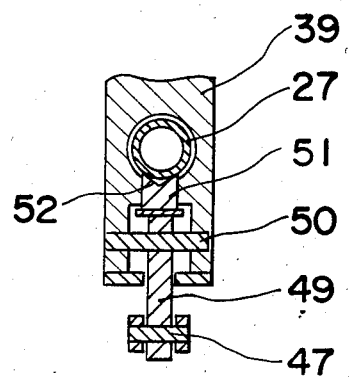
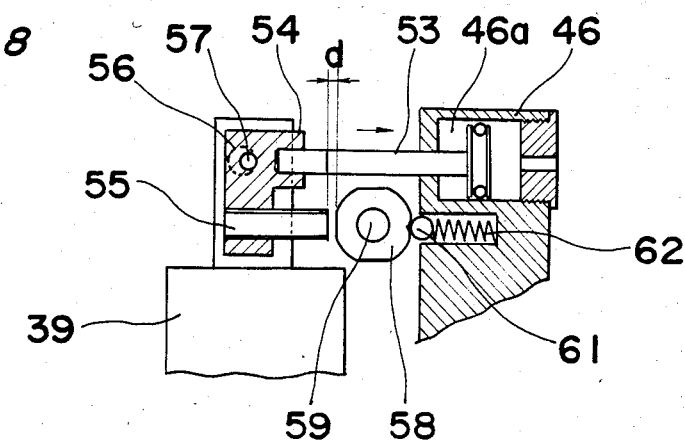
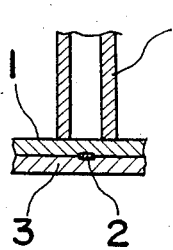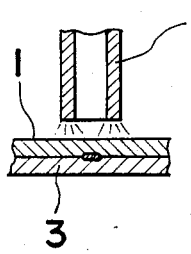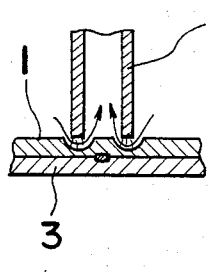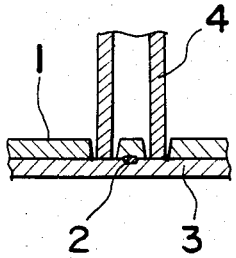

METHOD AND APPARATUS FOR DEMOUNTING A SPOT WELDED METAL PLATE

BACKGROUND OF THE INVENTION

1. Field of the Invention

The present invention relates to a metal treating method, and more particularly to a metal treating method of melting, on the periphery of the weld, a metallic plate partially welded on a metallic member and demounting the metallic plate from the metallic member, an to and apparatus for performing the method.

2. Description of the Prior Art

In the repair the sheet metal of a vehicle, the sheet metal, which is spot-welded at many portions, is required to be demounted from the vehicle. As a method of demounting the spot-welded metallic plates of this type, it was the conventional method to vertically depress a drill against the weld of the metallic plate and lower the drill, while rotating the drill by a motor, to sink it to a required depth. This method required the drilling of a center hole, or centering. Also, as the weld increased in hardness due to the thermal influences during the welding operation, a substantial drill depressing force was required for sheet metal removal so that the lower plate was often damaged, thus requiring labor and skill to be performed correctly. In addition, the consumption of the edge tool was large, resulting in high cost.

SUMMARY OF THE INVENTION

An object of the present invention is to provide a method and an apparatus, which is free from the above-described disadvantages, does not require much labor or skill of the operators, and allows the demounting operation from the weld to be effected in a short time.

Another object of the present invention is to provide a method and an apparatus, which melts the periphery of the weld of a metallic plate by the use of an electric arc, removes the molten metal without scattering it, and disconnects the metallic plate from the weld.

A further object of the present invention is to provide a metal treating apparatus, which is capable of always performing a melting operation under constant conditions by the depression of an electrode-rod tip-end, set on a torch, against the metal-to-be-treated even when a carbon electrode rod of a consumption type has been used as a hollow electrode rod.

A method of the present invention comprises the steps of causing a hollow electrode rod to oppose the periphery of the weld of a metallic plate in an approximately vertical orientation with respect to the metallic plate, forming an arc between the electrode rod and the metallic plate, melting the periphery of the weld of the metallic plate with the arc heat, and sucking the molten metal through the hollow portion of the electrode rod.

According to the method of the present invention, the metallic plate is melted at the periphery of the weld by the arc heat, and the molten metal is quickly sucked and removed through an electrode rod, which serves as a suction nozzle. Thus, the metallic plate is cut away in an extremely short time from the welded metallic member thereof. Accordingly, as the operator is not required to apply force as in the conventional method of using a drill, the working time becomes extremely short. Also, since the melting operation is not required to be performed as deep as the lower plate due to the controlling operation of the arc in accordance with the thickness of the metallic plate, it is not required that the operator be skilled. In addition, the molten metal is removed through the electrode rod, the sparks are not scattered, and the working environment is not deteriorated.

The apparatus of the present invention comprises an internal hollow rod, which is provided with an electrode rod retaining portion for retaining an hollow electrode rod at its tip end, a rod retaining mechanism for retaining said internal rod for free longitudinal motion, an elastic member for urging said internal rod forwardly, a sliding block which is urged forwardly so far as a given position by the elastic unit and which can be freely moved longitudinally, a guide piece for causing its tip end to come into contact with a metal to be treated thereby to determine the reference position of the tip end of the electrode rod, a mechanism for engaging the sliding block with said rod to retreat the block together with the internal rod, a mechanism for releasing the engagement of the internal rod with said sliding block, a suction apparatus for causing the suction force in the hollow portions of the internal and electrode rods, and a conductor for carrying current to the electrode rod through the internal rod.

According to the apparatus of the present invention, the metal treating operation can be effected under constant conditions by the sequential operations of a mechanism which depresses an electrode rod against the surface of a metal-to-be-treated with a guide piece as a reference, applies a voltage between the electrode rod and the metal-to-be-treated to retract a sliding block in engagement with the internal rod, with a mechanism for releasing the engagement of the sliding block with the internal rod, and with a suction apparatus. Also, an apparatus, which engages the sliding block with the internal rod to adjust the amount on retraction, is added to adjust the space between the electrode rod and the metal-to-be-treated during the formation of the arc thereby to vary the arc conditions in accordance with the particular metal to be treated. With the apparatus, the consumption of the electrode rod can be adjusted so that the position of the guide piece can be adjusted. In addition, an apparatus for retracting the sliding block with respect to the internal rod, and an apparatus for adjusting the amount of rotation are added to control the depth of melting of the metal to be treated.

BRIEF DESCRIPTION OF THE DRAWINGS

These and other objects, features and advantages of the present invention will become more apparent from the following detailed description of the present invention when taken in conjunction with the accompanying drawings, in which:

FIG. 6 is a cross-sectional view showing the relationship between a sliding block and a rod employed in the torch of FIG. 5;

FIG. 7 is a cross-sectional view taken along a line VII—VII' of FIG. 6;

FIG. 8 is a plan view, cross-sectioned in part, showing the essential portions of the sliding block of FIG. 6;

FIGS. 9(a) to 9(d), are schematic views for the purpose of explanation of the processes of treating a metal according to the present invention.

DESCRIPTION OF THE PREFERRED EMBODIMENTS

Figure 1:
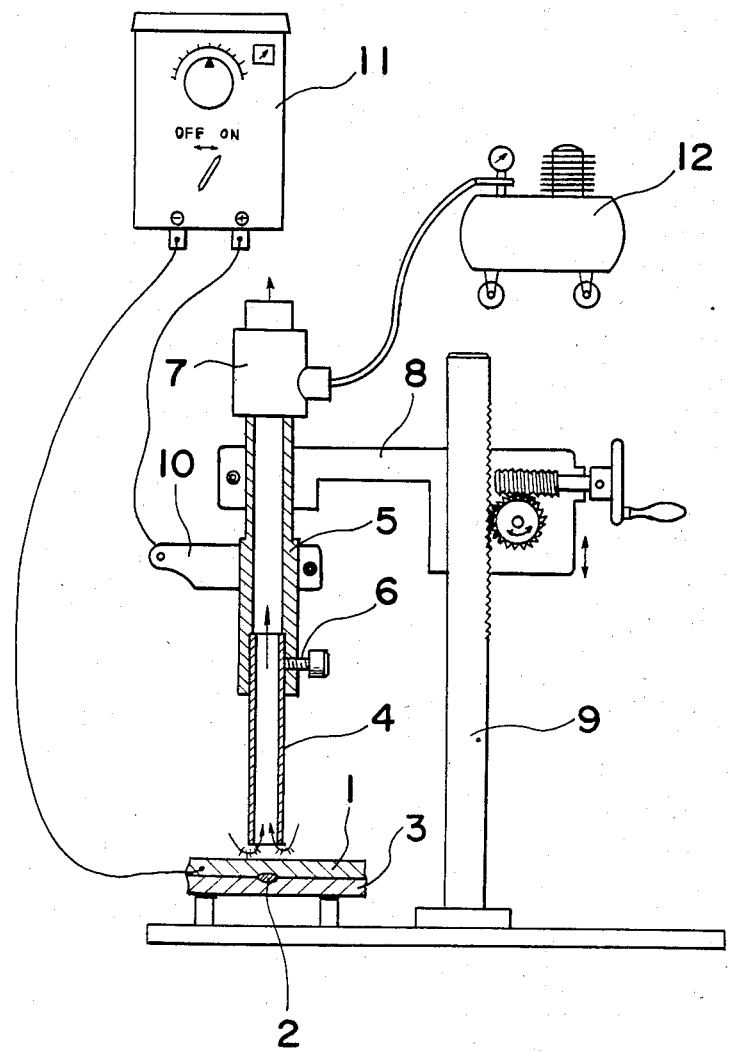
FIG. 1 is a schematic view partially in cross section with parts removed, for the purpose of explanation only, showing a metal treating apparatus, to illustrate the principle of the treating method of the present invention.

Before the description of the present invention proceeds, it is to be noted that like parts are designated by like reference numerals throughout the accompanying drawings.

Referring to FIG. 1, a metallic plate 1 is spot-welded at a part 2 to a metallic member 3. A hollow carbon electrode-rod 4 is fixedly supported by a screw 6 on the tip end of a holder 5 made of a metallic hollow member, of which upper end is mounted on the lower end of a suction device 7, the inner hole of the rod 4 being passed through the inner holes of holder 5 and suction device 7 in succession. A support member 8 made of an insulating material (half of the outer walls of which have been removed in FIG. 1 to show its interior parts), supports the holder 5 and can be moved vertically with respect to a support stand 9 through engagement between a rack and a pinion which are provided on the support member 8 and the stand 9, respectively. A conductive member 10 coupled to the holder 5 is connected with the positive pole of a power source 11, while the metallic plate 1 to be located facing the lower end of the electrode-rod with a space therebetween, is connected with the negative pole of the power source.

Figure 2:
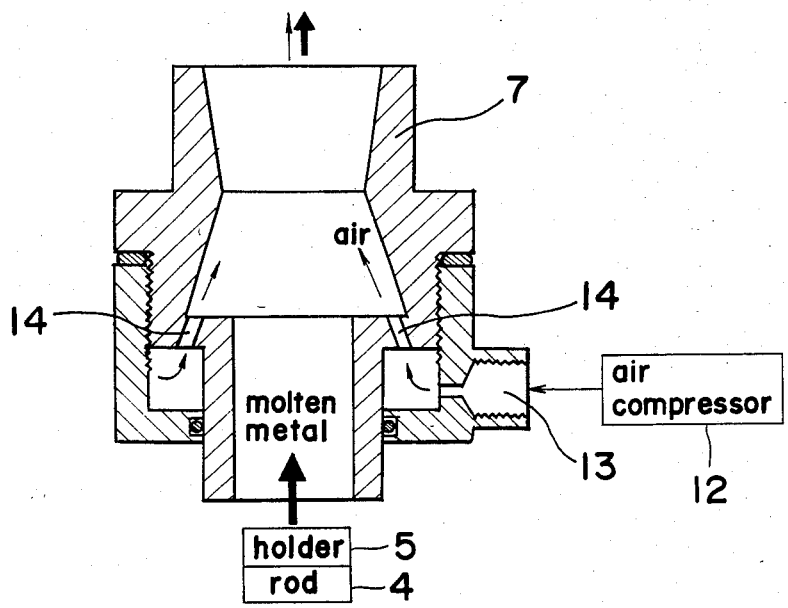
FIG. 2 is a longitudinal cross-sectional view of an suction means employed in the apparatus of FIG. 1.

The suction device 7 has an inlet side opening to the hollow portion of holder 5 and is constructed as shown in FIG. 2. Suction device 7 is adapted to blow at a high speed through an orifice 14 to an exhaust compressed air introduced from an air introducing opening 13 coupled to an air compressor 12, thereby to cause the negative pressure on the inlet side at the hollow portion of the holder 5.

The operation of the above apparatus will be described hereinafter. Firstly, the hollow carbon electrode rod 4 is brought into contact with the surface of the metallic plate 1 in vertical relation with respect to the metallic plate 1' and may surround the spot-welded part 2. Then, the power source switch is turned on to apply the electric power between the conductive member 10 and metallic plate 1 through the rod 4 and holder 5, and, the support member 8 is then lifted the support stand 9 to separate the tip end of the electrode rod 4 slightly from the metallic plate 1 so as to provide a space therebetween. At this moment of the separation a spark is generated and an arcing is caused between the electrode rod 4 and the metallic plate 1. The suction device 7 is then actuated by operating the compressor 12 at a time point when the arcing has been stabilized at a certain amount, to suck and remove from the surface of the metallic plate 1 to the outside thereof through the electrode rod 4, holder 5 and suction device 7, molten metal melted by the arcing heat, together with the air around the molten metal. Thereafter, the holder 5 is lowered an amount equal to the thickness of the metallic plate 1, and then the power source is stopped turning off the switch.

The hollow carbon electrode-rod 4 should be vertically arranged with respect to the metallic plate. When it is tilted at an angle smaller than a right angle, the condition of the molten portion disposed on the surface of the metallic plate 1 becomes uneven with respect to the spot welded portion 2 and also the tip end of the electrode rod 4 is unevenly consumed. The hole diameter of the electrode rod 4 requires 50% or more with respect to the outer diameter. Also, the size of the hole of the rod 4 is required to be made larger than the size of the weld diameter. When the hole diameter is too small in comparison with the outer diameter of the weld, the suction flow through the suction device 7 is restricted, the molten metal on the metallic plate 1 is attached, or the thermal influences upon the lower plate becomes larger through the weld, thus damaging the lower plate. In addition to the carbon rod 4 of the above embodiment, a non-consumption type electrode rod such as tungsten electrode may be used.

A concrete example of the construction of the apparatus of the present invention will be described hereinafter in conjunction with FIGS. 3 to 9.

Figure 3:
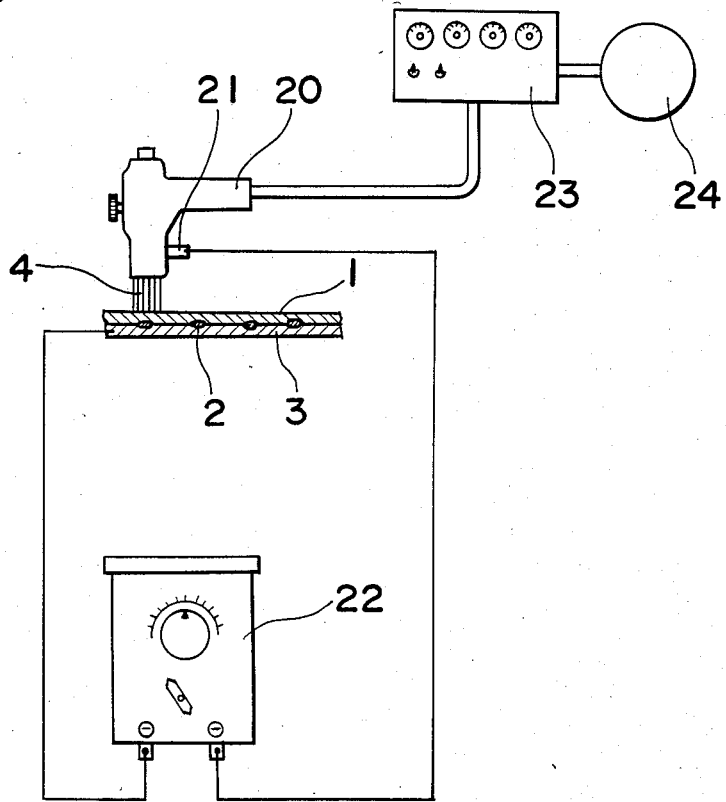
FIG. 3 is a schematic view for the purpose of explanation of the working operation of a torch according to the present invention.

Referring to FIG. 3, a metallic plate 1 is spot-welded to the metallic plate 3 by a part 2, and is positioned facing the tip end of a hollow carbon electrode rod 4. A torch 20 of tubular type retains at its tip end the hollow carbon electrode rod 4 with the holes of the torch 20 and rod 4 connected together in succession and is provided with a conductor 21, which is connected with the positive pole of the power source apparatus 22 to carry current to the electrode rod 4. One of the metallic plates 1 and 3 to be treated is connected with the negative pole of the power source apparatus 22. The torch 20 is further connected with a control apparatus 23 which is in turn connected with an air compressor 24.

Figure 4:
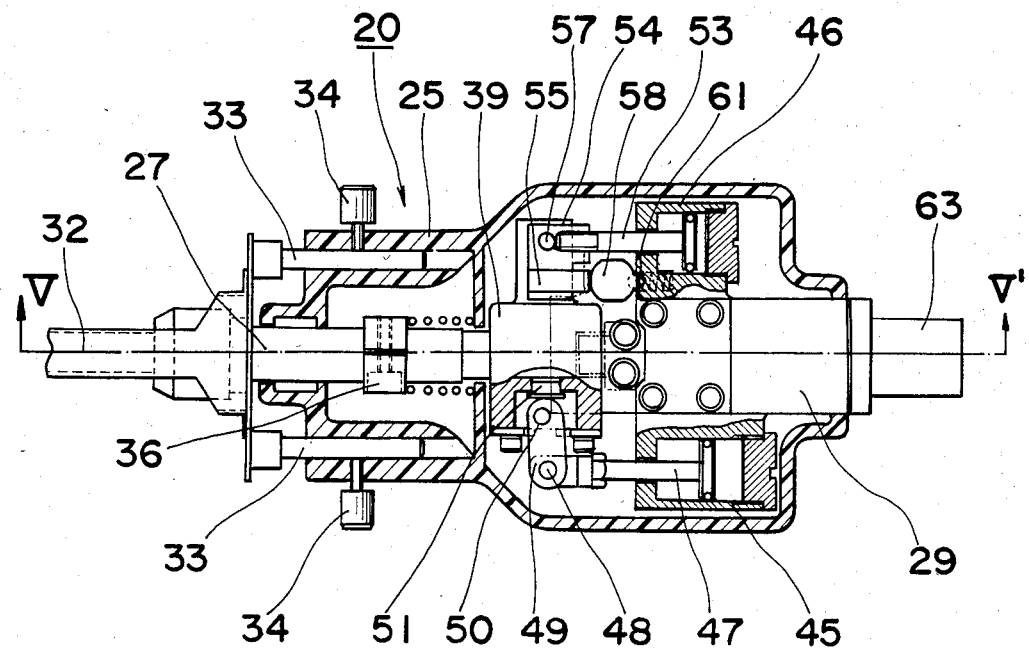
FIG. 4 is a cross-sectional view showing the essential portions of the torch of FIG. 3.
Figure 5:
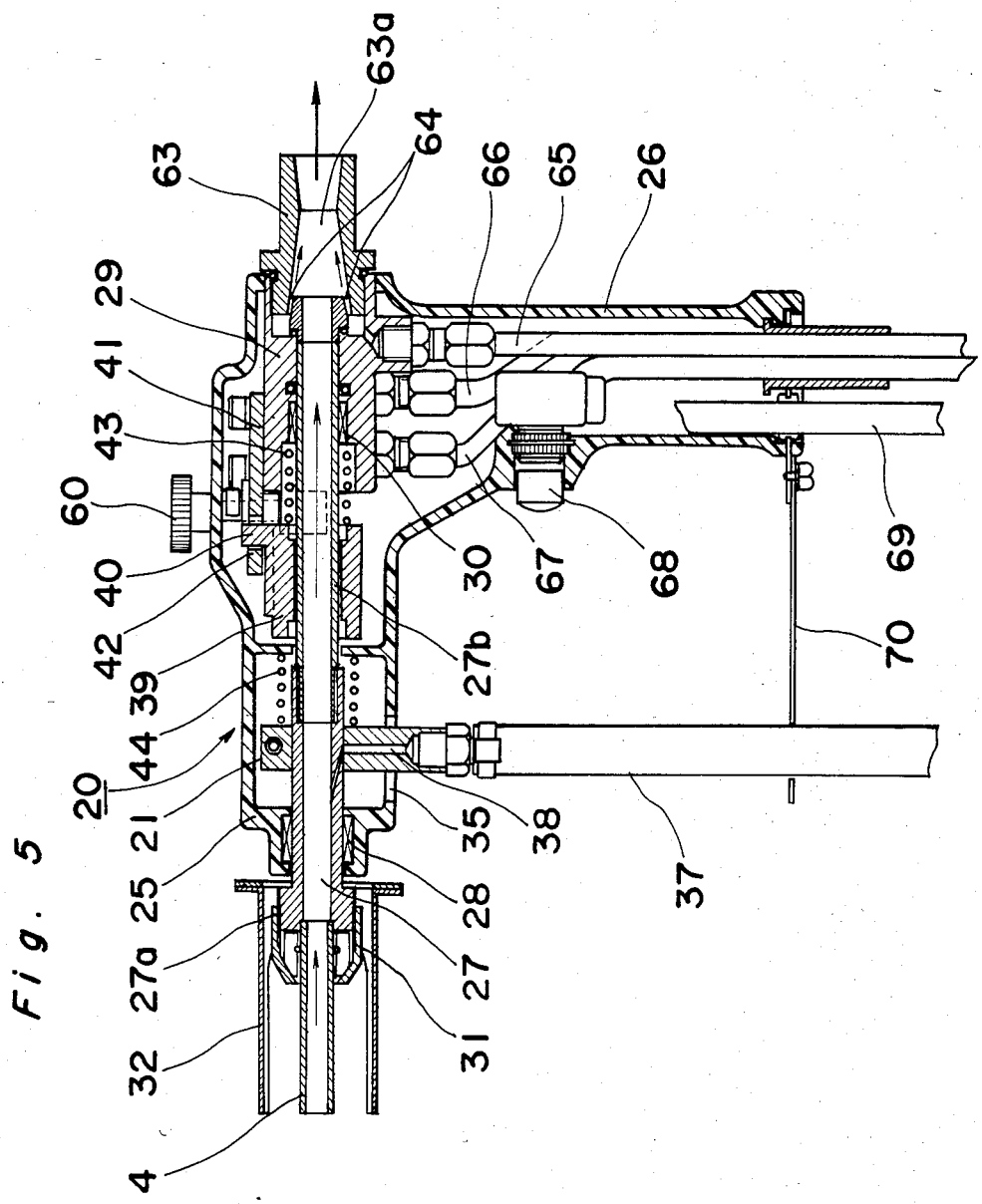
FIG. 5 is a longitudinal cross-sectional view of the torch of FIG. 3 taken along line V—V in FIG. 4.

FIGS. 4 and 5 show the construction of the torch 20. A case 25 made of synthetic resin is approximately L-shaped, the rear bent portion 26 thereof is a handle portion. A hollow movable rod 27 is formed of hollow members 27a and 27b, and is engaged for longitudinal sliding operation with bearings 28 provided in the front portion of the case 25 and bearings 30 provided in the base stand 29 secured to the case rear portion. The rod 27 is provided, at its tip end, with a chuck 31 which is used to hold the hollow carbon electrode rod 4 to the rod 27. A guide 32, which is adapted to vertically depress the electrode rod 4 against a metallic plate to be treated, has two pins 33 provided on the rear portion inserted into respective holes of the case front-face and are secured with respective screws 34. A conductor 21 for carrying a current to the electrode rod 4 through the rod 27 is inserted into the case from the through hole 35 provided in the side face of the case 25 and is fixed to the member 27a of the rod 27 with the screw 36. The conductor 21 is coupled to a coaxial cable 37 through which the current and the compressed air are sent. A passage 38 through which the compressed air is sent communicates with the hollow portion of the rod 27 through the through a hole in the side of the rod 27. The conductor 21 moves together with the rod 27 and moves only within the range of the through hole 35. Accordingly, the conductor 21 functions to restrict the amount of longitudinal motion of the rod 27.

A sliding block 39 is engaged with the outer periphery of the rod 27 in the front portion of the base stand 29. A projection 40 disposed on the top face of the rear portion of the sliding block 39 extends into a through hole 42 of a regulating plate 41 secured to the base stand 29. The sliding block 39 can longitudinally move within a range wherein the projection 40 can move within the through hole 42 (which is wider than projection 40). However, the sliding block 39 is normally urged forwardly by a spring 43 inserted between the sliding block 39 and the base stand 29. A spring 44 inserted between a partition wall of the case and the conductor 21 is adapted to urge the rod 27 forwardly.

The base stand 29 is provided, on its left side, with a cylinder 45 for causing the sliding block 39 to be engaged with the rod 27 to move the rod 27 and, on its right side, with a cylinder 46 for adjusting the position of the sliding block 39 with respect to the rod 27.

The operations of the cylinder 45 and the sliding block 39 will be described hereinafter with reference to FIG. 6 and FIG. 7. One end of a link 49 is supported, by a shaft 48, on the end of a piston 47 engaged with the cylinder 45, and the other end of the link 49 is rendered eccentric by a shaft 50 so that it may be supported by the sliding block 39. A locking pin 51, which is inserted into the sliding block 39, is provided, at its tip end, with a V-shaped groove 52 to engage the outer periphery of the rod 27.

The link 49 is normally located in the position of the phantom line of FIG. 6. The end portion of the link supported by the eccentric shaft 50 is not in contact with the rear end of the locking pin 51. The block 39 has no binding force on the rod 27. Accordingly, the rod 27 can normally move freely in the longitudinal direction. However, if compressed air to the air is fed chamber 45a of the cylinder 45, the piston 47 moves rightwardly in the drawing, and the link 49 moves to a position of the solid line of FIG. 6 so that the end, on the side of the shaft 50, of the link 49 depresses the rear face of the locking pin 51. Thus, the pin 51 advances to depress the rod 27 through the groove 52 of the tip end of the pin so that the sliding block 39 and the rod 27 are integrated through the pin 51. Once the piston 47 further moves in the right direction in the drawing, the sliding block 39 and the rod 27 move rightwardly by the space the piston 47 moved. The motion is restricted to a range where the projection 40 of the sliding block 39 described hereinabove can move within the through hole 42 of the regulation plate 41.

By cutting off the supply of the compressed air to the air chamber 45a of the cylinder, the sliding block 39 advances by the forces of the springs 43 and 44, retaining the binding force of the rod 27 caused by the pin 51. Also, by feeding the compressed air into the air chamber 45b of the cylinder, the operation is effected in the order reverse to the above-described locking process so that the link 49 returns to the position of its original chain line to release the rod 27 from the sliding block 39.

The operations of the sliding block 39 and the cylinder 46 will be described hereinafter with reference to FIG. 8.

A coupling metal fixture 54 is secured through screw engagement to the end of a piston 53 engaged with the cylinder 46. A pin 55 projects rearwardly from the metal fixture 54 and a pin 57 projects from metal fixture 54 into a long hole 56 provided in the sliding block 39. As the block 39 is forwardly urged by the spring 43, the pin 57 is engaged with the rear side of the long hole 56.

On the other hand, an adjusting jig 58 is mounted, by a shaft 59, on the base stand 29, opposite to the pin 55 of the metal fixture 54, and is coupled to an adjusting handle 60 projecting out of the case. The adjusting jig 58 can be pivoted by the operation of the handle 60, and the clearance d between the peripheral face thereof and the pin 55 can be adjusted in stages. A ball 61 for rotation preventing use is pressed against the side face of the adjusting jig 58 by a spring 62.

By feeding the compressed air into the air chamber 46a of the cylinder 46 the piston 53 moves rightwardly. Thus, the coupling metal fixture 54 moves the sliding block 39 rightwardly by engagement of the pin 57 until the pin 55 hits against the regulating jig 58. The operation at this time has nothing to do with the locking operation performed by the cylinder 45. Namely, the cylinder 46 retracts the sliding block 39, by the clearance d, independently of the rod 27 and the cylinder 45.

Referring back to FIG. 4 and FIG. 5, a suction apparatus 63 is hermetically coupled to the rear portion of the base stand 29. The exhaust passage 63a of the suction apparatus communicates with the hollow portion of the rod 27. The compressed air from a conduit 65 is jetted at a high speed from several orifices 64, which are provided on the side wall portion directed toward the side of the exhaust, to cause negative pressure on the side of the rod 27 thereby to suck the molten portion of a metal to be treated (to be described below) with the carbon electrode rod 4 as a suction nozzle.

Referring also to FIGS. 6 and 8, two conduits 66 coupled to the air chambers 45a and 45b of the cylinder 45, a conduit 67 coupled to the air chamber 46a of the cylinder 46, a lead wire 69 coupled to an operation switch 68, in addition to a conduit 65 connected to the suction apparatus 63, are inserted into the handle 26. Reference numeral 70 designates a support member for the coaxial cable 37.

The operation of this apparatus will be described hereinafter with reference to FIGS. 1 and 4–9(d).

A hollow carbon electrode rod 4 is engaged with the tip end of the rod 27 by a chuck 31. In this condition, the sliding block 39 is not combined with the rod 27. As the rod 27 is urged forwardly by the spring 44, the tip end of the electrode rod 4 is projected from the end of the guide 32.

Then, the handle 26 is held to vertically depress the tip end of the electrode rod 4 against a metallic plate 1 to be treated, to align the tip end of the electrode rod 4 with the tip end of the guide 32 (FIG. 9(a)). The compressed air is then fed into the air chamber 46a of the cylinder 46, and the sliding block 39 retracts by a portion corresponding to the space d in the same manner as described hereinabove. In this case, the projection 40 is adapted to retract by the space d from a condition where the projection 40 is in contact with the leading edge of the branch hole 42 of the regulation plate 41 through the urging force of the spring 43. The power source switch is next turned on. In this condition, the electrode rod 4 is in short circuit with the metallic plate 1.

The compressed air is then fed to to the air chamber 45a of the cylinder 45 causing the piston 47 to retract, thereby integrating the sliding block 39 with the rod 27 and causing rod 27 to retract as described hereinabove with reference to FIG. 6 until pin 55 hits jig 58. Thus, the electrode rod 4 separates from the metallic plate 1 to cause arc therebetween (FIG. 9(b)).

When the cylinders 45 and 46 are released, the sliding block 39 becomes free with respect to the cylinders 45 and 46 but the binding force by the locking pin 51 is not released. Thus, the sliding block 39 starts to advance due to the urging force of the spring 43 (FIG. 9(c)).

Concurrently, the suction apparatus 63 is operated to suck the molten portion of the metallic plate 1 with the electrode rod 4 as a suction nozzle.

The rod 27 advances under the binding force of the sliding block 39, until the tip end of the electrode rod 4 projects by the space d below the surface of metallic plate 1, i.e., until the projection 40 of the sliding block 39 hits against the leading edge of the through hole 42 of the regulation plate 41. Once the periphery of the weld 2 of the metallic plate 1 is melted, the electrode rod 4 comes into contact with the metallic plate 3 as a lower plate so that the melting operation does not proceed further (FIG. 9(d)).

Thereafter, the power should be turned off and compressed air is fed onto the side of the air chamber 45b of the cylinder 45 to release the binding force on the rod 27 by the sliding block 39.

The above-described series of operations are automatically performed, by the controlling apparatus 23, through depression of a switch 60 with the electrode rod 4 being depressed against the metal to be treated. The operation and release of the cylinder is controlled by the switching on and off of a electromagnetic valve. Also, the compressed air can be properly supplied from the coaxial cable 37 to remove foreign matter adhered to the interior of the hollow portion of the rod 27.

In the above-described embodiment, the most desirable type of torch was described wherein the electrode rod 4 was retracted by a given amount from a reference position where the tip end of the electrode rod 4 was depressed against a metal to be treated for alignment with the tip end of the guide piece 32 thereby to cause an arc between the electrode rod and the metal to be treated, and the electrode 4 was projected by desired amount from the tip end of the guide piece 32.

Figure 10:
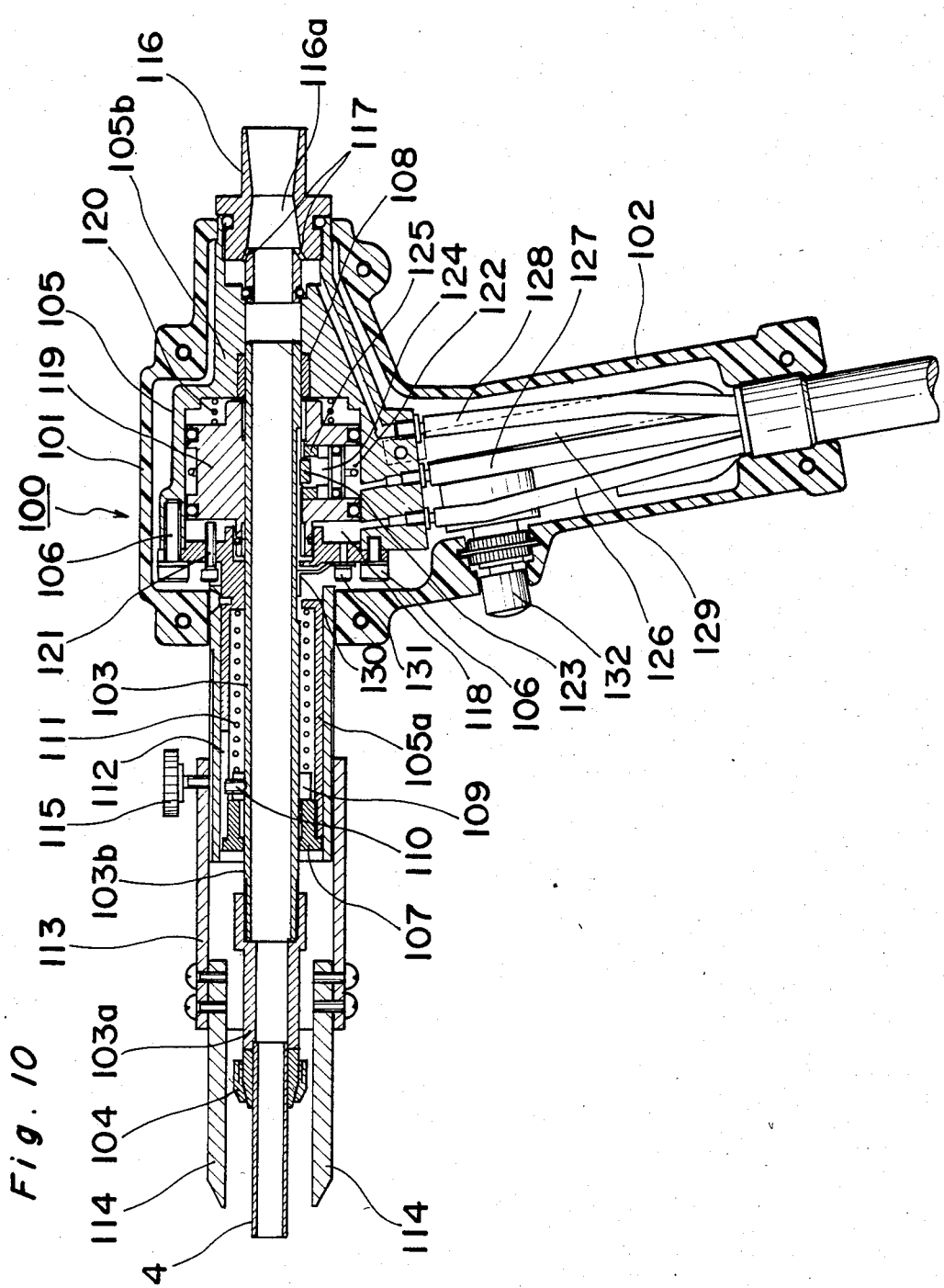
FIG. 10 is a longitudinal cross-sectional view showing another embodiment of a torch to be employed in an apparatus of the present invention.

A torch 100 of further simplified construction will be described with reference to FIG. 10. The difference between the former and the latter are that an apparatus for adjusting the length of the electrode to be projected from the tip end of the guide piece is removed, and a cable through which a current flows to the electrode rod is accommodated in the handle of the case.

A case 101 made of synthetic resin is provided, at its rear portion, with a handle portion 102. A hollow rod 103 which is a combination of a hollow conductive member 103a and a hollow conductive member 103b is provided, at its tip end, with a chuck 104 for retaining the electrode rod 4. A base stand 105, which is a combination of a pipe-shaped conductive member 105a and a conductive member 105b having a concave space provided in its front portion connected by a screw 106, has the rod 103 engaged therewith extending freely therethrough in the longitudinal direction. A bush 107 is screwed into the tip end of the conductive member 105a. A bush 108 is provided on the side of the rear portion of the member 105b.

A stopper 109 is secured to the outer periphery of the rod 103 with a screw 110. A spring 111 is inserted between the stopper 109 and the rear portion of the member 105a. The rod 103 is urged forward with the stopper 109 so far as a position where the stopper 109 hits the rear end of the bush 107 by the spring 111. The conductive member 105a is provided with a notch 112, which allows the head of the screw 110 to be longitudinally moved. The rod 103 can be retracted against the elasticity of the spring 111 until the head of the screw 110 hits against the rear edge of the notch 112.

A cylindrical retainer 113, which has a pair of guide pieces 114 secured to the tip end thereof, is engaged with the barrel of the tip end of the case 101 for free adjustment of its longitudinal position and is secured to a given position by a set screw 115.

A suction apparatus 116, which is connected with the rear end of the base stand 105, is provided with an exhaust passage 116a communicating with the hollow portion of the rod 103 and a plurality of open orifices 117 opening rearwardly into the exhaust passage 116a, adjacent the sidewalls thereof.

A cylinder chamber 118 is provided in the center of a base stand 105 where the member 105a connects with the member 105b. A sliding block 119, which is inserted for free longitudinal motion into the cylinder chamber 118, has the rod 103 extended therethrough at its center for free longitudinal motion and O-rings engaged therewith on this outer periphery. A spring 120 urges the sliding block 119 forwardly. A screw 121 adjustably limits the forwardmost position of the sliding block.

The sliding block 119 is provided, at its lower portion, with a cylinder chamber 122. The cylinder chamber has a piston 124, which has an O-ring engaged therewith on its outer periphery and a friction plate 123 made of rubber or the like engaged therewith at its tip end. Reference numeral 125 denote a bush.

A conduit 126 feeds the compressed air into the cylinder chamber 118. A conduit 127 feeds the compressed air to the cylinder chamber 122 of the sliding block 119. A conduit 128 feeds the compressed air through the orifices 117 to the suction apparatus 116. The conduits are coupled to the base stand 105 accommodated within the handle 102. An electric cable 129, which is accommodated within the handle 102 and is connected with the base stand 105, is adapted to carry current to the rod 103 through the bushes 108 and 109 provided on the base stand 105. To ensure the electric connection between the base stand 105 and the rod 103, an elastic metallic piece 130, which comes into pressure contact against the outer periphery of the rod 103, is secured to the base stand 105 with a screw 131. A switch 132 is provided on the handle 102 and is connected with the controlling apparatus as in the above-described torch 20.

The operation of the rod 103 and the sliding block 119 will be described hereinafter.

The sliding block 119 is normally located in an advanced position, where the block hits against the tip end of the screw 121, urged by the spring 120 and the rod 103 can move freely with respect to the sliding block. In this condition of the torch 100, compressed air is fed to the cylinder chamber 122 of the sliding block 119 by conduit 127, and piston 124 advances to bring the friction plate 123 into the pressure contact against the outer periphery of the rod 103, whereby the rod 103 is restrained by the sliding block 119. In this condition of torch 100, compressed air is fed by the conduit 126 to the cylinder chamber 118, and the sliding block 119 retracts until the block hits agains the rear wall face of the cylinder chamber 118, restraining the rod 103. The compressed air in the cylinder chamber 122 is then released after the lapse of a given amount of time, and the binding force of the rod 103 caused by the piston 124 is thereby removed. The rod 103 then advances until the stopper 109 hits against the bush 107 by the action of the spring 111. Then the compressed air in the cylinder chamber 118 is released and the sliding block 119 returns to its original position by the action of the spring 120.

The operation of this apparatus will be described hereinafter.

The hollow carbon electrode rod 4 is held in engagement with the tip end of the rod 103 by the chuck 104. The tip end of the electrode rod 4 at this time is adapted to be projected from the tip end of the guide piece 114. This can be performed by adjusting the position of the retainer 113 for retaining the guide piece with respect to the case 101.

Then, the electrode rod 4 is depressed against a metal to be treated with the electrode rod 4 being rendered approximately vertical (perpendicular) to the metal to be treated by the manual holding of the handle 102. As the rod 103 retracts, the tip end of the guide piece 114 is depressed against the metal to be treated. Then, the switch 132 is turned on, and a voltage is applied between the electrode rod 4 and the metal to be treated. This condition corresponds to the above-described condition illustrated in FIG. 9(a).

Then, the compressed air is introduced into the cylinder chamber 122 from the conduit 127, and the rod 103 is restrained by the sliding block 119 as described hereinabove. Then, the compressed air is introduced into the cylinder chamber 118 and the sliding block 119 retracts restraining the rod 103. The electrode rod 4 separates from the metal to be treated to form an arc between the electrode rod 4 and the metal-to-be-treated as shown in (FIG. 9, b). The space between the electrode rod and the metal-to-be-treated at this time conforms to the amount of retraction the sliding block 119, which is determined by the longitudinal position of the adjustment screw 21.

The cylinder chamber 122 is released, and the rod 103 is released from the binding by the sliding block 119 to start its advancement. This condition corresponds to the condition shown in FIG. 9(c).

The compressed air is then fed to the suction apparatus 116 by the conduit 128 to render the interior of the rod 103 negative in pressure. The molten portion of the metal to be treated is sucked with the electrode rod as a suction nozzle. Also, through the advancement of the rod 103, the electrode rod 4 enters into a portion where the molten portion of the metal to be treated has been sucked and removed, and hits against the non-molten portion as shown in FIG. 9(d).

The above-described series of operations are controlled by the controlling apparatus as in the torch 20 in the above-described example.

A concrete example will be described hereinafter. The spot weld of two soft, mild steel plates of 0.8 mm in thickness has been fused by the use a carbon electrode, which is of 6.0 mm in inner diameter, 9.5 mm in outer diameter and has a copper plating layer on its outer surface, and a power supply which has the dropping characteristic of the DC as the outer characteristic. The operation has been completed in approximately one second with 300 A in current and 30 V in voltage. In this case, compressed air of 5 through 7 kg per $cm^3$ was passed to the portion of the suction apparatus to cause a negative pressure of approximately 2,000 mm aq. Thus, the molten metal could be almost completely removed.

As described hereinabove, according to the present invention, the metallic plate attached partially by spot welding or the like can be easily detached. Also, as the molten metal is removed by the suction, sparks are not caused and the work environment is not spoiled.

Although the present invention has been described and illustrated in detail, it is to be clearly understood that the same is by way of limitation, the spirit and scope of the present invention being limited only by the terms of the appended claims.

What is claimed is:

1. A method of demounting a metal plate spot welded to a metal member, comprising the steps of:
   (1) placing a hollow electrode rod having a free tip perpendicular to the metal plate in air such that the tip of the electrode rod opposes a ring-shaped portion of the metal plate at the periphery of a spot weld between the metal plate and the metal member;
   (2) forming and maintaining a continuous electric arc, through the air, between the electrode rod and the metal plate;
   (3) melting only a ring-shaped portion of the metal plate at the periphery of the spot weld with continuous arc heat to form molten metal on the metal plate; and
   (4) drawing up the molten metal through the hollow portion of the electrode rod.

2. A method as in claim 1, wherein the electrode rod is a hollow carbon rod.

3. A metal treating apparatus, comprising:
   a. a longitudinally extending hollow internal rod having a forward tip end, said tip end including an electrode rod retaining portion for retaining a hollow electrode rod having a free forward end;
   b. a rod retaining mechanism; said internal rod being retained and freely longitudinally movable in said rod retaining mechanism in opposite forward and rearward directions;
   c. a sliding block, freely longitudinally movable in said forward and rearward directions;
   d. means for preventing forward movement of said sliding block forward of a predetermined forward position;
   e. urging means for elastically urging said sliding block and said internal rod in said forward direction;
   f. engaging and moving means, including means for disengagably engaging said sliding block with said internal rod so that said internal rod is movable in said rearward direction with said sliding block against the urging of said urging means, and first moving means for moving said sliding block, and said internal rod therewith, in said rearward direction to a first predetermined rearward position;
   g. means for releasing said internal rod from engagement with said sliding block;
   h. an electrical conductor connected to said internal rod for providing current to the electrode rod through said internal rod; and
   i. establishing means, including a guide piece mounted on said retaining mechanism and contactable with a metal member to be treated, for establishing a reference position from which the free end of the electrode rod is movable a first predetermined distance rearward from the metal member.

4. An apparatus as in claim 3, further comprising means for drawing melted metal rearward through the electrode rod and said internal rod.

5. An apparatus as in claim 3, further comprising means for adjusting the longitudinal location of said first predetermined rearward position.

6. An apparatus as in claim 3, wherein said establishing means includes means for adjusting the longitudinal position of said guide piece.

7. An apparatus as in claim 3, further comprising means for moving said sliding block relative to said internal rod a second predetermined distance in said rearward direction and means for adjusting the length of said first predetermined distance.

8. An apparatus as in claim 3, further comprising means for adjusting the relative longitudinal positions which said internal rod and said sliding block have while said engaging means is engaging said internal rod with said sliding block.

9. An apparatus as in claim 3, wherein said reference position establishing means comprises means for automatically positioning the free end of the electrode rod against the metal member when said tip end of said guide piece is in contact with the metal member and the internal rod is perpendicular to the metal member.

10. An apparatus as in claim 9, further comprising second moving means for moving said sliding block in a rearward direction from said predetermined forward position to a second predetermined rearward position forward of said first predetermined rearward position while said internal rod is in a stationary position where the free end of the electrode rod is in said reference position; said engaging means including means for engaging said sliding block with said internal rod while said sliding rod is in said second predetermined rearward position, said first moving means including means for moving said sliding block and said internal rod therewith in said rearward direction to said first predetermined rearward position; said apparatus further comprising means for deactuating said first moving means without deactivating said engaging means, so as to permit said urging means to move said sliding block and said internal rod together in said forward direction until said sliding block is in said predetermined forward position and the free end of the electrode rod is forward of said reference position.

11. An apparatus as in claim 4, wherein said internal rod has inner walls defining a longitudinal passageway, said drawing means including a gas passage communicating with said passageway midway of the longitudinal extent thereof and means for feeding compressed air into said passageway through said gas passage to remove matter attached to said inner walls.

12. An apparatus as in claim 3, wherein said elastically urging means comprises a first elastic member connected to and between said rod retaining mechanism and said internal rod, and a second elastic member connected to and between said rod retaining mechanism and said sliding block.

13. An apparatus as in claim 3, wherein said conductor and said internal rod comprise means for supplying a continuous current to the electrode rod for continuously melting a metal to be treated located in longitudinally spaced relation to the free forward end of the electrode rod.

* * * * *